(12) United States Patent  
Maleknejad (10) Patent No.: US 11,395,141 B2  
(45) Date of Patent: Jul. 19, 2022

(54) AUTHENTICATION SYSTEMS AND METHODS

(71) Applicant: Hooman Maleknejad, San Diego, CA (US)

(72) Inventor: Hooman Maleknejad, San Diego, CA (US)

(*) Notice: Subject to any disclaimer, the term of this patent is extended or adjusted under 35 U.S.C. 154(b) by 85 days.

(21) Appl. No.: 16/828,855

(22) Filed: Mar. 24, 2020

(65) Prior Publication Data

US 2020/0336904 A1 Oct. 22, 2020

Related U.S. Application Data

(60) Provisional application No. 62/835,972, filed on Apr. 18, 2019.

(51) Int. Cl.
| | |
|---|---|
| *H04W 12/06* | (2021.01) |
| *G06K 19/06* | (2006.01) |
| *H04L 9/40* | (2022.01) |
| *H04W 12/106* | (2021.01) |

(52) U.S. Cl.
CPC ...... *H04W 12/06* (2013.01); *G06K 19/06037* (2013.01); *H04L 63/0861* (2013.01); *H04W 12/106* (2021.01)

(58) Field of Classification Search
CPC ............... H04W 12/06; H04W 12/106; G06K 19/06037; H04L 63/0861; H04L 64/0884
See application file for complete search history.

(56) References Cited

U.S. PATENT DOCUMENTS

| | | | |
|---|---|---|---|
| 2015/0341333 A1* | 11/2015 | Feng | H04L 9/3297 |
| | | | 713/168 |
| 2017/0251014 A1 | 8/2017 | Eisen | |
| 2017/0262845 A1 | 9/2017 | Eisen | |
| 2017/0337542 A1* | 11/2017 | Kim | G06F 3/048 |
| 2018/0039983 A1 | 2/2018 | Eisen | |
| 2018/0130052 A1 | 5/2018 | Eisen | |
| 2018/0295153 A1 | 10/2018 | Eisen | |
| 2018/0322501 A1 | 11/2018 | Eisen | |
| 2019/0147159 A1 | 5/2019 | Eisen | |
| 2019/0205874 A1* | 7/2019 | Hamid | G06Q 20/3829 |
| 2020/0322480 A1* | 10/2020 | Sena, Jr. | H04W 12/72 |

* cited by examiner

*Primary Examiner* — Ashokkumar B Patel  
*Assistant Examiner* — William B Jones  
(74) *Attorney, Agent, or Firm* — DLA Piper LLP (US)

(57) ABSTRACT

A secure software system that will allow desktop, web, or mobile applications, or devices that run embedded software to delegate their authentication to a mobile device, and upon authentication, the secure software system allows those applications to delegate to the mobile device other tasks such as sharing files, taking pictures, recording videos or audios, entering text, making calls, sending text messages, getting geographical location of the user, or performing a payment is disclosed. This software system does not store any user credentials or private information. It integrates with the applications and is available on all platforms via an integration code. The users will not need to enter any credentials and can quickly authenticate thus simplifying the workflow.

16 Claims, 5 Drawing Sheets

AUTHENTICATION SYSTEMS AND METHODS

CROSS REFERENCE

This application is related to and claims priority from U.S. Provisional application 62/835,972 filed 18 Apr. 2019, the entirety of which is hereby incorporated by reference.

FIELD

Embodiments of the invention described in this specification relate generally to authentication and delegation, and more particularly, to a secure software system that will allow desktop, web, or mobile applications, or devices that run embedded software to delegate their authentication to a mobile device, such as a smartphone or a wearable computing device, and upon authentication, allows those applications to delegate to the mobile device other tasks of those applications, such as sharing files, taking pictures, recording videos, recording audio clips, entering text, making calls, sending text messages, getting geographical location of the user, performing a payment and/or other computing tasks.

BACKGROUND

Current authentication methods rely on username and password. Passwords are either weak or hard to remember. Most people use the same username and password for multiple accounts. Some users use password managers to manage their credentials, but password managers still rely on a one or more master credentials (such as username and password) which makes them vulnerable. They also store credentials for the accounts of all of their users and if compromised, all users and their accounts will be affected.

There are other solutions such as single sign-on, and multi-factor identification, but they also rely on the username and password. Single sign-on is one set of credentials to access multiple accounts, so if compromised puts security of multiple systems in risk. Multi-factor identification can complement authentication methods based on username and password, but they are not convenient for the users.

Also, many non-mobile applications should be accompanied by a mobile version to perform mobile friendly tasks, such as taking pictures, videos, recording audios, entering text, making calls, sending text messages, or getting the geographical location of the user. That adds unnecessary cost to the operational cost of the businesses.

Therefore, what is needed is a way for users to not need to enter any credentials but quickly authenticate to simplify workflows and to standardize delegating and performing mobile-friendly tasks integrating with the applications in a way that reduces the need to install mobile versions of the web and desktop applications without storing any user credentials or private information.

In addition, password manager software and apps store user credentials and private information and are potentially vulnerable to hacking attacks. Password managers may not integrate with the applications, which hurts user experience. Password managers that run on different devices may not synchronize credentials in real time. By contrast, the secure software system that delegates authentication and other tasks to a mobile device of the present disclosure does not store any user credentials or private information. The secure software system also integrates with the applications and is available on all platforms via an integration code. The users of the secure software system that delegates authentication and other tasks to a mobile device will not need to enter any credentials and can quickly authenticate thus simplifying the overall workflow.

SUMMARY

A secure software system is disclosed that delegates authentication from a source system to a mobile device and, upon authentication, allows the source system to further delegate other tasks to the mobile device. In some embodiments, the secure software system that delegates authentication and other tasks to the mobile device includes an API server, a particular mobile client app running on a mobile device, and a third-party customer application. In some embodiments, the API server may be hosted on a network server and includes an application that visually outputs a graphical user interface (GUI) that allows the administrator users to register third-party customer applications. In some embodiments, the API server exposes a set of APIs and may be deployed and configured to be accessible to mobile clients and third-party customer applications. In some embodiments, the particular mobile client app may run on a mobile device that includes one or more sensors that can capture bio-identifying sensor inputs. In some embodiments, the particular mobile client app may perform authentication and delegated tasks that work in connection with a proper verified authentication session. In some embodiments, the bio-identifying sensor inputs include at least one of a fingerprint and a face recognition scan. In some embodiments, the third-party customer application may use secret credentials or certificates to communicate with the API server. In some embodiments, the third-party customer application includes one of a desktop application, a web application, a mobile app, and an embedded application that runs on a hardware device. Upon authentication, the secure software system of some embodiments that delegates authentication and other tasks to the mobile device allows the specific applications to delegate, to the mobile device, other tasks. Examples of other tasks include, without limitation, sharing files, taking pictures, recording videos, recording audio clips, entering text, making calls, sending text messages, getting geographical locations of the user, or performing a payment.

BRIEF DESCRIPTION OF THE DRAWINGS

Having thus described the invention in general terms, reference is now made to the accompanying drawings, which are not necessarily drawn to scale, and which show different views of different example embodiments, and wherein:

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications. Further, any combination of embodiments described could be made and such examples are not intended to be limiting.

Overview

In the current software ecosystem, countless third party customer software applications may be used for any number of things. The user of modern computing systems may utilize dozens of such software applications for anything from email communications, text communications, calendars, social media interfaces, cameras, telephone, video phone, news outlets, banking, or any number of other modern conveniences. However, due to the need for security, such third party customer applications may utilize a myriad of login/password combinations in order to access and ensure users are authenticated. Authentication using username and password may not be the most secure method, and may introduce operational costs to enforce password policies, renew and reset passwords to the organizations. Having so many disparate systems each with their own security password and login credentials is cumbersome and inefficient. Further, the arrangement also presents a risk of users using weak credentials which are more easily discovered or hacked. In some cases, human users either use weak passwords, share their usernames and passwords, or have difficulty maintaining their usernames and passwords.

Also, such password managers may not integrate with the applications, which impacts the user experience. Further, password managers that run on different devices may not synchronize credentials in real time.

The systems and methods here may be used as authentication methods to eliminate the need to username and password and instead rely on biometric sensors of the mobile devices to simplify and secure the authentication process. In such examples, sensors may be utilized as described herein, for biometric identification purposes including but not limited to fingerprint sensors, cameras configured for facial recognition, cameras configured for iris recognition, cameras configured for retina recognition, heart monitors configured for bio-rhythm recognition, microphones configured for speaker recognition, or any other kind of biological recognition system including sensors, either alone or in combination of any of the above or other.

Such computing devices that may run such applications, may also be equipped with biometric sensors, and software to utilize such sensors for authentication of a particular user as described below. By utilizing biometric data of a user and relating that data with a user account, the use of cumbersome and ever-changing passwords may be bypassed altogether, yet security may still be maintained, or even increased. In example embodiments, third party-applications may register with the systems here, and thereby enforce authentication using biometrics only, biometrics or device pin, or none of them. If the application enforces authentication using biometrics the mobile app may prompt the user to use biometrics. If it allows either biometrics or device pin, the user will have the option to either use biometrics or the device pin. If none of them are enforced, the mobile app may authenticate the user using a scanned code, such as a QR code which may be sent for display to an authenticated computing device.

Another security consideration is, if every one of the countless third party customer software applications individually stored the biometric data of each of its users, such biometric data may be more vulnerable to hacking or exposure. Instead, if a single interface could be utilized that coordinated biometric authentication on the mobile device, using the sensors there, with the myriad of third party customer applications, the ease of biometric authentication could be had along with a more secure storage of the biometric data. In some example embodiments, the biometric authentication data may not even be stored remotely, but instead be stored only on the local mobile device, thereby eliminating the need for remote storage or transmission of user biometric data. In some examples, the operating system of the computing device or third party application may store and utilize the biometrics with the associated sensors to authenticate a user, instead of the software described herein. In such examples, the software methods and systems here may only call that operating system or third party application and request the authentication instead of separately storing and authenticating the biometric data itself. Any combination of the examples may be employed.

Systems and methods here allow for coordination of the countless number of third party customer applications and a single biometric repository, or localized storage of biometric data for authentication of each of the registered yet diverse software applications. The result is a streamlined yet secure system and method of authentication. This system may be utilized for initial authentication of a user for an application, and/or an authentication for follow-on tasks and/or for delegating tasks, such as biometrics-based authentication, payment, verification of the communication initiator, and other tasks that may be extraneous or additional to the underlying application's ability (for example an in-application purchase, or authorization to use a camera, etc.).

The secure systems and methods described herein that delegates authentication and other tasks to a mobile device of the present disclosure may not store any user credentials or private information. In some example embodiments, the secure system may integrate with the third-party applications running on a mobile device and may be available on a broad range of platforms via an integration code. The third-party customer application that delegates authentication and other tasks to a secure system may not need to ask its users to enter any credentials and may quickly authenticate a user thereby simplifying its overall workflow.

Figure 1:
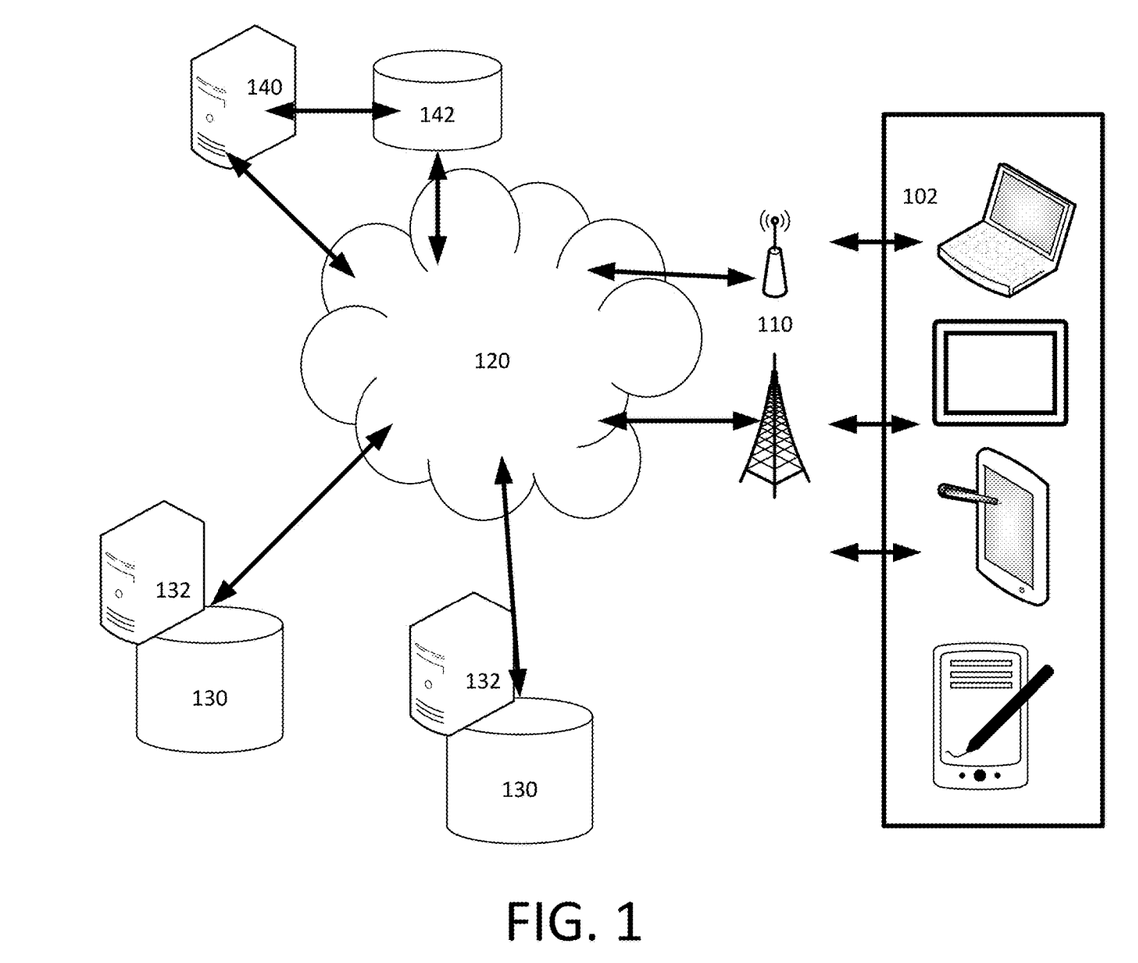
FIG. 1 is an example network diagram that may be used to practice the methods described herein, according to the embodiments herein.

The authentication and task delegation system shown in FIG. 1 may be composed of multiple components:

This authentication and task delegation system can be used for any application on any connected device 102. The third-party applications that use this authentication and task delegation method can be applications that run on desktops or laptops, web applications that are accessed on desktops or laptops or mobile devices, native mobile apps that run on mobile devices, or any embedded software applications that run on a hardware device.

The third-party applications that use the authentication and task delegation system can communicate with the authentication and task delegation server using any available networking interfaces such as WiFi or LTE connections 110.

The third-party applications and authentication and task delegation system can be deployed on the intranet or internet

120. As long as the third-party application and the mobile client of the authentication and task delegation system have access to the authentication and task delegation API server, their authentication and task delegation workflows can work.

Multiple instances of the authentication and task delegation API servers 132, 140 can exist to handle different sets of the third-party applications.

One or more instances of the Authentication and Task delegation API servers can use one or more database servers 130, 142 to store and manage applications, users, authentication sessions, task delegation requests, and task results.

In some example embodiments, the secure systems and methods that delegate authentication and other tasks to the mobile device may include a back end system 132 and 140 such as an Application Program Interface (API) server, a mobile client software application running on the mobile device 102, and a third party or customer-side software application, all in communication with one another. In some example embodiments, the API server may be hosted on a network server and include an application configured to generate a graphical user interface (GUI) that may allow an administrator user to register submitted third-party or customer applications. These third party applications could be any kind of software application which are in need of authentication approval by the systems and methods described herein. In some example embodiments, the back-end system 132 and 140 may automatically approve the submitted third party software applications based on previously decided thresholds or metrics. In some example embodiments, the back end or API server 132 and 140 may expose and/or present a set of APIs and may be deployed and configured to be accessible to mobile clients and third-party customer applications. In some embodiments, the particular mobile client app may run on a mobile device 102 that includes one or more sensors that can capture bio-identifying sensor inputs, as described herein.

It should be noted that the term mobile device, or computer used herein could be any kind of computing capable device or devices which may transmit data, analyze data, compute date, communicate including communicate wirelessly; such devices may be but are not limited to a smartphone, tablet computer, phablet computer, laptop computer, desktop, wearables such as smart glasses, smart watches, smart wristbands or any other kind of computing device.

Initial Authentication

Systems and methods here may be utilized to authenticate a user, using biometric sensors on a computing device, for a myriad of third-party applications, instead of utilizing a login/password combination in the old way, piecemeal, for each individual application by itself. Thus, such systems and methods here may not be individual and proprietary for a single software application, but instead act as a gateway by integrating with any and all third party software applications, thereby allowing the users to bypass the login/password combination, and thereby making every application accessible using biometric sensor access.

Figure 2:
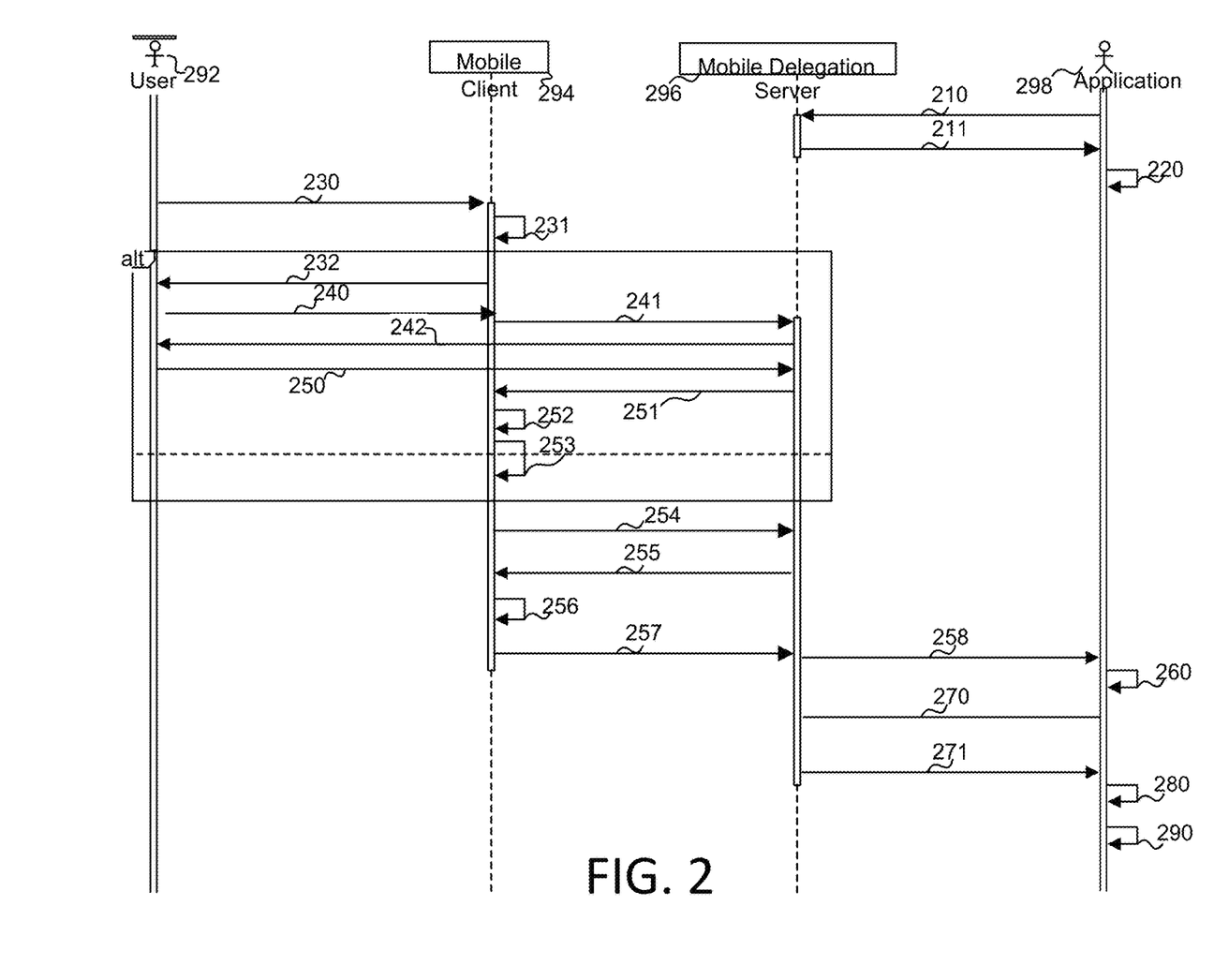
FIG. 2 conceptually illustrates an example authentication sequence diagram associated with a secure software system that delegates authentication and other tasks to a mobile device in embodiments disclosed herein.

FIG. 2 shows example steps of how this authentication may be accomplished in an initial scenario, where a user wants to first access a third party software application that is running on some computing device. In FIG. 2, an example authentication sequence is shown among a user 292, mobile authentication client 294, mobile authentication server 296, and third-party application 298. In this example embodiment, the method begins with the third-party application 298 requesting 210 the authentication payload from the mobile authentication server 296. The mobile authentication server 296 then returns 211 the downloadable authentication payload to the third-party application 298. The third-party application 298 may render or otherwise send the downloadable authentication payload 220. The user 292 may transfer 230 the authentication payload from the third-party application to the mobile client 294. The mobile client 294 may then download 231 the downloadable authentication payload from the third-party application 298.

In some example embodiments, sending, rendering, and scanning the QR code is an example of how to transfer the authentication payload from the third-party application to the mobile client. In such examples, the QR code includes instructions or code that is downloaded to the computing device scanning it, through a network or internet connection. For example, the code to request a QR code from the systems and methods here, or the code to wait and listen to authentication events, and the code to authenticate to the system and receive the user identifier, device information, and geographical location of the user. In some examples the QR code links the computer scanning it to the instructions or code over a network such as the internet.

In some examples, such as IoT devices or hardware devices that run embedded applications, the transfer of the authentication payload may occur by way of a http link, hypertext link, or other similar computer link. In some examples, the transfer may occur by way of a near field communications connection, such as those used by NFC standards, Bluetooth Low Energy, or other similar wireless communications. WiFi, cellular, or other similar wireless transfer methods may be used alone or in combination as described herein.

In some embodiments, unique alphanumeric sequences can be assigned to the authentication payloads and the users can manually enter the same sequence to an user interface of the Mobile Client to start the authentication workflow. This can be done by instrumenting the current multi-factor identification systems to perform a similar authentication workflow.

In some example embodiments, the secure software system that delegates authentication and other tasks to a mobile device pre-identifies the user on the application side. This is also another possible way of implementing this authentication system. Instead of transferring the authentication payload from the third-party app to the mobile client, both the third party application and the mobile client may pre-identify the user and the user mobile device, and trigger an authentication when required. In such examples, the mobile client may prompt the user to use the biometric sensors to verify her/his identity and the rest of the workflow will be the same. This can be done, for example, by using web browser cookies, and the operating system such as but not limited to iOS or Google push notifications to notify the Mobile Client that a specific user wants to authenticate. In some other implementations the current Multi-factor Identification systems can be instrumented to send a mobile-friendly task request to an agent that is running on the user's mobile device.

Continuing with the example of FIG. 2, the mobile client 294 requests 254 the application information from the authentication server 296. The authentication server 296 returns the application information 255. The mobile client 294 verifies the user 292 identity with the available biometric sensor 256, as described herein. If the identity is verified, the mobile client 294 authorizes 257 authentication by sending an authorization message to the authentication server 296. The authentication server 296 notifies the third party application 298 that the authentication is authorized 258. The third party application 298 then submits the login form with the authentication payload 260. The third party application 298 may then request the authentication server 296 to authenticate 270. After requested, the authentication server 296 returns 271 the application specific user identifier, device information, and/or geographical location of the user 292 to the third party application 298. The third party application 298 applies the device and location based authentication business logic 280. The application 298 then maps the application specific user identifier to the internal user information 290. In some examples, the internal user information may be locally stored, stored in a distributed database, and/or stored in a back end system. Any combination of these may be utilized to authenticate a user by the local computing operating system, third party application or the system and methods described herein.

Initial Authentication—First Time Registration

Still referring to FIG. 2, part of the workflow describes an optional initial authentication registration which may not occur after the initial registration has occurred. Such a registration may only happen if a user has not yet registered the mobile client on the authentication server that handles the authentication workflow for this specific third party application. In such initial authentication examples, the mobile client 294 may then request the user 292 to submit an email address or phone number 232. Those are the current methods to validate user's identity. Other sources of user identification may be used, such as but not limited to, ID cards or social security number in future. The user 292 may then provide a mobile client 294 with requested email address or phone number 240. The mobile client 294 may then register 241 the device at the mobile authentication server 296. The authentication server sends 242 a confirmation email or text message to the user 292, via the mobile client 294. The user 292 confirms 250 the device registration to the authentication server 296 via a response through the mobile client 294. The mobile authentication server 296 notifies the mobile client 294 that the device is registered 251. The mobile client 294 saves the device registration 252. Finally, the mobile client 253 is registered.

Task Delegation

Figure 3:
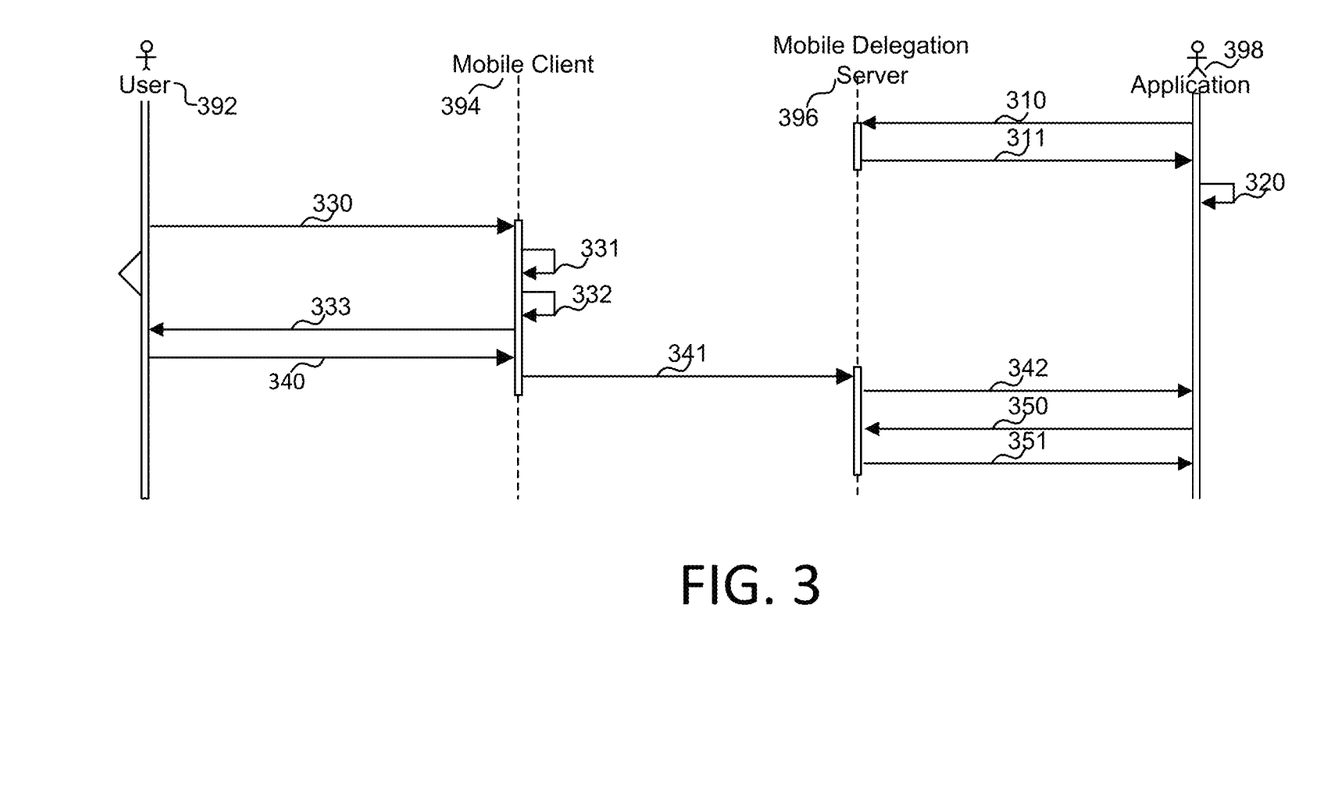
FIG. 3 conceptually illustrates an example delegate mobile friendly task sequence diagram for the secure software system that delegates tasks to the mobile device in embodiments disclosed herein.

FIG. 3 is an example diagram showing how an application may use the systems and methods here for authentication of a user and approve some follow-on, extra, or additional task that is somehow outside the bounds of what the application normally accomplishes, or somehow requires additional authentication for sensitive procedures. For example, a user first utilizes the above systems and methods to access a third party application. While using the third party application, the user is presented with the option of some extra activity, for example, to take a picture with the mobile phone, purchase an item, share files, and/or make a phone call, or other task. Such a scenario may arise while utilizing the third party application but the third party application needs to utilize some other hardware, or requires some additional sensitive approval before proceeding. In such examples, a second round of authentication may be called, in order to ensure that the task or extra/additional request is authorized. In such examples, the term task is used to describe these extra, additional or other requests.

FIG. 3 shows an example task sequence diagram among the user, mobile client running on a mobile device as described herein, a mobile delegation server computer, and a third-party application. In the example shown in FIG. 3, the application 398 gets 310 the task request payload from the mobile delegation server 396. Depending on the type of the third-party application, a task request payload may be a proper form that will facilitate downloading the task request payload. For example, a web or desktop application will request to receive a QR code that will represent that unique Task Identifier. A mobile third-party application, on the other hand, will receive a link that once it is tapped by the user, will launch and transfer the unique task request identifier to the mobile client app.

The mobile delegation server 396 returns the downloadable task request payload 311 to the third-party application 398. The third-party application 398 renders 320 the downloadable task request payload. Depending on the type of the third-party application, rendering may be a proper form that may facilitate downloading the task request payload. For example, a web or desktop application will request to receive a QR code that will represent that unique Task Identifier. A mobile third-party application, on the other hand, will receive a link that once it is tapped by the user, will launch and transfer the unique task request identifier to the mobile client app.

The user 392 then requests 330 the mobile client 394 to start the task. In this example, a task could be any number of extra or additional requests such as but not limited to Processing a payment, share a document, take a picture, shoot a video, record a voice message, make a call, send a text message, get geographical location of the user, or other similar mobile-friendly tasks. Next, the mobile client 394 transfers 331 the downloadable task request payload from the application 398. The mobile client 394 then identifies the task and shows the appropriate steps to perform the task 332. The mobile client 394 then asks the user 392 to complete the steps to perform the task 333. The user 392 may then complete the steps 340 via the mobile client 394. Next, the mobile client 394 may upload the task result 341 to the mobile delegation server 396. Then the mobile delegation server 396 may notify the third-party application 398 that the task is complete 342. The third-party application 398 may request the task result 350 from the mobile delegation server 396. Finally, the task delegation server 396 may return the task result 351 to the application 398.

In some example embodiments, users of non-mobile third party applications may not need to install the mobile version of those applications (if available) or manually perform mobile-friendly tasks such as sharing files, taking pictures, videos, recording audio clips, entering text, making calls, sending text messages, or getting the geographical locations of a user. After the user has been authenticated, any such application can delegate their mobile-friendly tasks to the secure software system of the present disclosure. The application then sends a request to perform the task to the user's mobile device and receives the result via this secure software system when it is complete.

In addition, in some example embodiments, the secure software system that delegates authentication and other tasks to a mobile device of the present specification reduces complexity and cost for applications by delegating their mobile-friendly tasks to the mobile agent of the example system. In addition, in some example embodiments, the secure system that delegates authentication and other tasks to a mobile device may improve the user experience by automating these mobile-friendly tasks.

Figure 4:
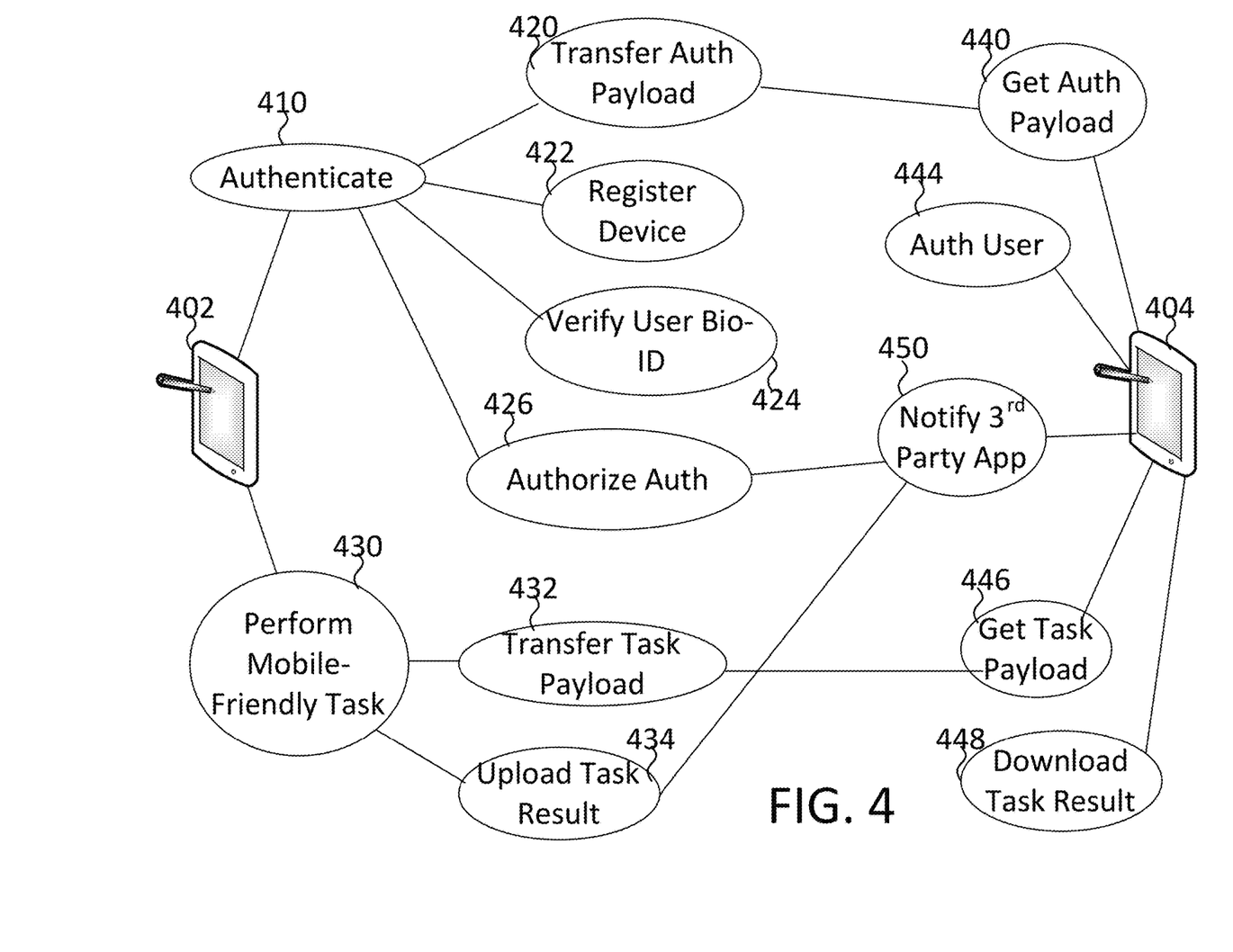
FIG. 4 conceptually illustrates an example use case diagram related to the secure software system that delegates authentication and other tasks to the mobile device in embodiments disclosed herein.

FIG. 4 shows example use cases for the secure system. In FIG. 4 a User may utilize a mobile device 402 and a Third party Application 404 may be utilized by a Business Agent. In some examples, a User may be a user of the Third party Application 404 that wants to perform a mobile-friendly task 430 (including but not limited to biometric-based authentication). In such examples, the Third party Application 404 may be configured to delegate mobile friendly tasks (including but not limited to identifying the user based on their biometric identifiers) to the secure software system. In the example, the Customer may be a human that wants to do business with an enterprise. The Customer may want to verify the identity of the entity that has sent an email or made a phone call on behalf of an enterprise. Business Agent may be a person or an automated system that sends emails or makes phone calls on behalf of a business. The business Agent may want to send verifiable (and/or signed) emails and make verifiable phone calls to the customers of the business.

In another example summary, the Authentication and Task Delegation system may be used in multiple use cases. Two actors who may use this system include a User 402 that wants to authenticate to or perform a task on a third party application 404, and a Third-party Application 404 that wants to delegate its authentication or tasks to the Authentication and Task Delegation system.

Example use cases of the system from the User actor's perspective include, Authenticate 410 where a user wants to gain access to an application, with example use cases, such as but not limited to, Register Device 422 where a user registers the device(s) that will run the authentication and task delegation client. This workflow will uniquely identify the device and assign its ownership to the user. Another example may be to Transfer Authentication Payload 420 where the user will transfer the authentication payload from the application to the authentication client. Another example may be to Verify the user's bio-identity 424 where the user will use the biometric readers of the device that runs the authentication client to identify himself/herself. Another example may be to Authorize Authentication 426 where the user will use the authentication client to authorize authentication to the application.

Another example from the User perspective may be to Perform Task 430 where the User wants to perform a task on the application, with example use cases such as but not limited to Transfer Task Payload 432. The user will use the task delegation client to transfer the task delegation request and its parameters from the application to the task delegation server. Another example may be to Upload Task Result 434 where the user will perform the task in the task delegation client and then will use the task delegation client to notify the application 450 that the task is done and the results are ready. Any combination of these or other examples may be utilized with the systems and methods described herein.

Still further, example use cases from the Application actor's perspective may include but are not limited to Get Authentication Payload 440 where the application will request the authentication payload from the Authentication API server 420 and will make it available for the users who want to authenticate. Another example may be Authenticate User 444 where the user authorizes the authentication, the application will receive the application-specific user identifier, device information, and geographical location of the user and can apply its authentication business logic to allow or deny access to the user. Another example may be Get Task Payload 446 where the application that wants to delegate a task will request a task delegation request payload from the Task Delegation API server. The application will then make it available for the user to download it and initiate the task. Another non-limiting example may be Download Task Result 448 where the user performs the task. The Task Delegation System will notify the application that the Task Result is ready to download. The application will then download the task result from the Task Delegation Server.

Any combination of these or other examples may be utilized with the systems and methods described herein.

Mobile and Non-Mobile Examples

It should be noted that some examples herein describe use of a mobile device with a camera that is able to scan a QR code using the mobile client and thereby trigger the authentication request to the authentication server. In some examples, only one computing device may be present, and therefore the two-computer solution using scanning may not be possible. In such examples, an application on the computing device may be used to access or utilize the biometric sensors on the computing device and thereby request authentication. For example, instead of having both a smartphone and a laptop, a user has only a laptop equipped with some kind of biometric sensor such as but not limited to a fingerprint sensor, camera, microphone, etc. In such examples, the authentication software may be utilized to directly access the biometric sensors or interface with other operating systems or software to request authentication using the biometric sensors.

API Examples

The example secure system that delegates authentication and other tasks to a mobile device of the present disclosure may include an API Server, a Mobile Client, and/or a Third-Party Customer Application. In some examples, the API Server may be described as the back-end system in communication with the various mobile clients. In some examples, the mobile client may be the various mobile devices disclosed herein. In some examples the third party customer applications may be described as the tasks or other applications running on the mobile client devices, which are desired to be unlocked by the authorization described herein.

This list of possible constituent elements is intended to be exemplary only and it is not intended that this list be used to limit the secure software system that delegates authentication and other tasks to a mobile device of the present application to just these elements. Persons having ordinary skill in the art relevant to the present disclosure may understand there to be equivalent elements that may be substituted within the present disclosure without changing the essential function or operation of the secure software system that delegates authentication and other tasks to a mobile device. Examples may include but are not limited to an API Server, Mobile Client, and/or Customer Application.

The various elements of the secure software system that delegates authentication and other tasks to a mobile device of the present disclosure may be set up in the following exemplary fashion. It is not intended to limit the scope or nature of the relationships between the various elements and the following examples are presented as illustrative examples only. The API Server, may be hosted on-premise on a customer network, or can be hosted on a distributed database such as so-called "cloud" networks. The API Server may include a graphical user interface (GUI) that allows the admin users to register the third-party Customer Application. The API Server may expose a set of APIs and should be deployed and configured in a way that, it can be accessible to both the Mobile Client and the third-party Customer Application.

The Mobile Client may be a mobile app that runs on a mobile device that has the capability to scan one or more bio-ID inputs (e.g., fingerprint, face scan, or any other biometrics sensors available on the mobile devices or other devices that will run the authentication client). The mobile device on which the mobile app runs can be any kind of computing device that is able to verify the identity of the user, including, without limitation, a smartphone, a tablet computing device, a smart watch, another type of wearable device, etc. In some example embodiments, the user interactions to perform authentication or perform a delegated task may happen on the Mobile Client.

The third-party Customer Application may be a desktop application, a web application, a mobile app, or an embedded application that runs on a hardware device. The third-party Customer Application could, in some examples, use the secret credentials that were assigned to it during the registration process to communicate with the API Server. An installation may include multiple registered third-party Customer Applications.

In some example embodiments, the secure system that may delegate authentication and other tasks to a mobile device by the API Server creating an authentication payload and transferring that payload to the third-party Customer Application. The third-party Customer Application may then use one of the approaches, including, without limitation, a barcode, a file, an NFC tag, or another approach, to make that authentication payload available for the next user that wants to authenticate.

Barcodes or QR code in the example of a web or desktop application may provide a way to transfer code to the mobile device that scans them. Authentication payload is a unique sequence that represents an authentication session. For the devices that do not have a display, such as a hardware device, internet of things devices, or access control gates, the same authentication payload can be transferred to the mobile device using a dynamic NFC emitter device. Once the mobile client scans the NFC tag and reads the authentication payload, the rest of the workflow will be completely similar to what has been explained in this document.

As described herein, some examples do not utilize a QR code or barcode. Instead, the authentication payload is somehow downloaded from the third-party application to the mobile client by another way, such as a link, Near Field Communication, WiFi, Bluetooth Low Energy, or by another way.

GeoFencing Examples

In some examples, alone or in combination, the systems may utilize geo-fencing or geographical location information in order to add to the authentication package. For example, in some embodiments, a mobile device or any computing device may include sensors to calculate a geographical location on the earth. Such sensors may include Global Positioning System antennae and software, cellular phone antennae and software, inertial navigation systems using gyros, ring laser gyros, or other sensors, timing mechanisms, or other ways to triangulate a position on the earth.

Using the location of the system, the authentication systems here may utilize that information to help authenticate a user, or add the geographical location of the user to the other biometric sensor information in order to authenticate a user.

Third Party Application Development Integration

The idea of using a mobile device's built-in biometric sensors to authenticate a user would not be very useful if the underlying third-party applications to which the authentication is supposed to be utilized, was not able to be integrated. One of the advantages of the systems and methods described herein, is that integration with third-party application may be centralized and streamlined, such that once it is set up for a particular application, it is then able to be used by all users of that application, regardless of which development company it comes from. In other words, authentication systems and methods here may be considered agnostic to the third-party application development, once the application is registered.

To register a third-party application for use with the systems and methods here, any application developer can register their application and add the required code to modify its current login page. Such registration may be done by providing a code snippet or widget that can be integrated with the third-party application to allow its user to use the new authentication and task delegation features. In some examples, the API Server will provide a set of credentials or certificates for the application that should be kept secret. The third-party Customer Application will use those credentials or certificates to request a unique authentication payload that should be exposed in a way that can be transferred to the mobile client.

In some embodiments, the API Server logic registers applications that are planning to delegate their authentication and other mobile-friendly tasks to the software platform, registers users and their devices, provides the authentication payload to the applications, verifies that an application is active and provides its information, authorizes authentication, authenticates the user and provide the user and device information to the application, expires the authentication session at the user's request, verifies the state of a session, handles the task request and transfers it to the application to download and transfer to the mobile client, handles the task result and tracks it back to the original request, and notifies the application that the task result is ready to download.

In some embodiments, the application may also implement a mapping between the unique user Identifier that will be provided to it, once the user authenticates, and its internal user record at the back end database or data storage. The application may also implement some algorithms to enforce the authentication rules that can work based on the mobile device information, and/or geographical location of the user. For example, a rule may be to only authenticate if the mobile device serial number matches what is stored on the system, or that a location is established for the mobile device by GPS, cellular, triangulation, or other location position identifier and must match within a certain pre-determined radius. In some examples, the third party application may also have specified a geofence to specify acceptable locations, as reported by the mobile device. In other examples, the third-party application may decide to only allow users that use a specific brand or model of mobile devices or use a specific version of the mobile operating system or version.

Once the Application obtains the unique user identifier from the API Server, and the user successfully authenticates, the Application may use the provided instructions to compose mobile-friendly task requests and expose the task payload with one of the methods that has earlier been used to transfer the authentication payload to the mobile client. The mobile client may process the task request payload, prompt the user to perform the task and then use the available communication channel between the API Server and the Application to notify the Application that the task result is ready to download. The Application may use the provided instructions to implement the required logic to download the task result from the API Server.

To make the secure software system that delegates authentication and other tasks to a mobile device of the present disclosure, a software platform may include: (i) API Server logic, (ii) Mobile Client logic, and (iii) Integration Code logic.

More Examples of Authentication Payload Download

Various examples may use different authentication options, such as but not limited to a manual user input, totally automatic authentication, or any variations of a combination of the two.

For example, instead of transferring the authentication payload from the third-party app to the mobile client, both the third party application and the mobile client may pre-identify the user and may trigger an authentication when required. In such examples, the mobile client may prompt the user to use the biometrics sensors to verify his identity and rest of the workflow will be the same.

To use the secure software system that delegates authentication and other tasks to a mobile device of the present disclosure, a user may go to the login form of an application that supports authenticating using the features and functions provided in some embodiments of the secure software system that delegates authentication and other tasks to a mobile device. Such a user may use the installed mobile client to read the authentication payload from the login form. For example, this can be done by scanning a QR code from the login form of the third party application, as described herein. In some embodiments, when the user is authenticating to an application the first time, the mobile client would warn the user in regards to the application that he/she is about to authenticate to (the warning made so as to prevent phishing attacks), and will ask the user to verify his/her identity with a bio-identifier method that is available on the mobile device. Once the mobile client verifies the identity of the user, the application may authenticate on behalf of the user and may transfer to its authenticated state. Furthermore, the application may authenticate automatically for all subsequent instances after the first time the user authenticates to the application, which may be a way to help prevent phishing attacks.

In some embodiments, the Application may also add some elements to its user interface that suggest to the user that certain tasks can be done on a user mobile device. For example, the application may show a button that shows the user can upload a picture from his/her mobile device. The user will use the installed mobile client to start the task on his/her mobile device. This can be done either using a supported data transfer method, or using an available push notification.

In some embodiments, the mobile client navigates the user through the required steps to perform the task. Once the task is complete, the third-party customer application will hint that the task is done. explains how the mobile client may navigate the user through the steps of performing the requested task.

Integration with Access Control Systems

Additionally, some embodiments of the secure system that delegates authentication and other tasks to a mobile device can be used in access control systems, where the access control gate may emit the authentication payload in a way that can be scanned by the user's mobile device. Internet of Things (IoT) devices or the hardware devices that do not have a convenient way to authenticate can also use the secure software system that delegates authentication and other tasks to a mobile device to authorize certain tasks or modes to the user. They can also emit the authentication payload in a way that can be scanned by the user's mobile device.

Also, the secure software system that delegates authentication and other tasks to a mobile device of the present disclosure can be adapted for use by way of all the functionalities of the Mobile Client, which can be incorporated into a hardware device that its sole purpose will be to allow the user to authenticate or authorize an operation.

For multi-factor identification, the secure software system that delegates authentication and other tasks to a mobile device can also support multi-factor identification for the applications that are using other authentication methods. For example, an application can enforce users to first log in with their credentials and then use the Mobile Client to authenticate using their mobile devices. The applications can also get the device information and geographical location of the users when they authenticate using this software platform. If the device that the user is using is not in compliance with the IT policies or the user's location is not within a defined area, the application can route the user to the login page, where the user should log in with his/her credentials.

For e-Signature purposes, the applications can use the secure software system that delegates authentication and other tasks to a mobile device to sign the data entry forms using the Mobile Client.

For Authorization needs, the secure software system that delegates authentication and other tasks to a mobile device can be used to allow the managers to authorize operations using the Mobile Client.

Physical Shop Payment Examples

For payment systems, the secure software system that delegates authentication and other tasks to a mobile device can integrate with the payment systems that will allow the third-party customers to authorize a payment using the Mobile Client. For example, the payment system can use the secure software system that delegates authentication and other tasks to a mobile device to generate and print a QR code on the receipts, and the third-party customers can use the Mobile Client to perform the payment on their mobile devices, or transfer their credit card information to the payment system.

Example Computing System

Figure 5:
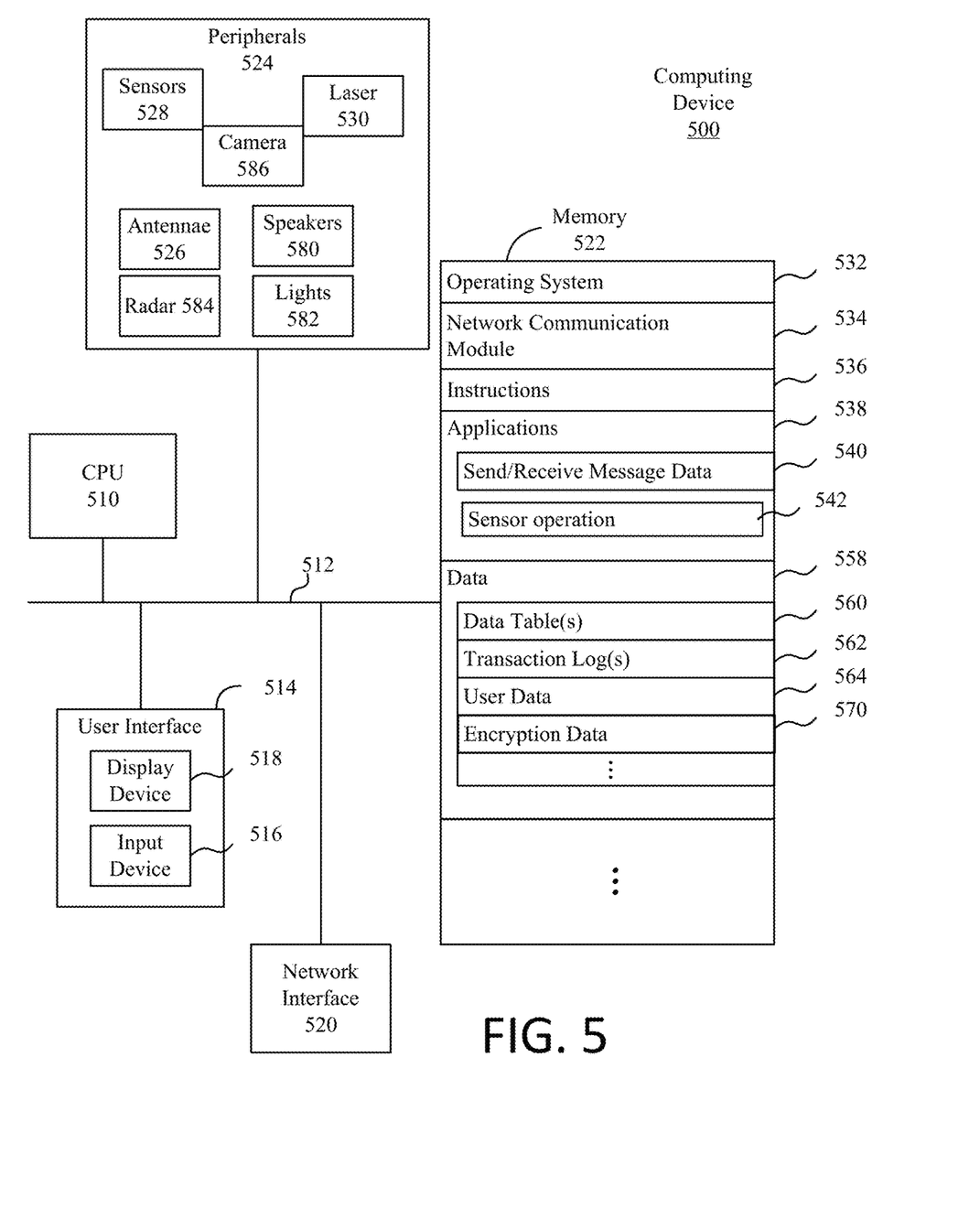
FIG. 5 is an example illustration of computer systems that may be used to practice the methods described, according to the embodiments herein.

FIG. 5 shows an example computing device 500 that may be used in practicing certain example embodiments described herein. Such computing device 500 may be the back-end server systems use to interface with the network, receive and analyze data, including sensor data, as well as coordinate GUIs for operators. Such computer 500 may be a server, set of servers, networked or remote servers, set to receive data, as well as coordinate data and display GUIs representing data. In FIG. 5, the computing device could be a server computer, smartphone, a laptop, tablet, wearable, or any other kind of computing device as described herein. The example shows a processor CPU 510 which could be any number of processors in communication via a bus 512 or other communication with a user interface 514. The user interface 514 could include any number of display devices 518 such as a screen. The user interface also includes an input such as a touchscreen, keyboard, mouse, pointer, buttons or other input devices. Also included is a network interface 520 which may be used to interface with any wireless or wired network in order to transmit and receive data to and from individual drones and/or relay stations. Such an interface may allow for interfacing with a cellular network and/or Wi-Fi network and thereby the Internet. The example computing device 500 also shows peripherals 524 which could include any number of other additional features such as but not limited to sensors 525, and/or antennae 526 for communicating wirelessly such as over cellular, Wi-Fi, NFC, Bluetooth, infrared, or any combination of these or other wireless communications. These could be operable on a drone or connected to the back-end itself. The computing device 500 also includes a memory 522 which includes any number of operations executable by the processor 510. The memory in FIG. 5 shows an operating system 532, network communication module 534, instructions for other tasks 538 and applications 538 such as send/receive message data 540 and/or sensor data 542. Also included in the example is for data storage 558. Such data storage may include data tables 560, transaction logs 562, sensor data 564 and/or encryption data 570.

CONCLUSION

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

As disclosed herein, features consistent with the present inventions may be implemented by computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various machines may be used with programs written in accordance with the teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks by one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Etc.

What is claimed is:

1. A method of authentication, comprising: by a mobile authentication server computer with a processor and a memory, in response to a user attempting a security required task, receiving a request from a third-party application for an authentication payload:
   returning a downloadable authentication payload to the third-party application, wherein the third-party application having registered and received an application identifier and a secret; wherein the authentication payload having been rendered or downloaded by the third-party application; wherein the authentication payload having been transferred from the third-party application to a mobile client; wherein the mobile client may download the downloadable authentication payload from the third-party application, receiving a request for third-party application information from the mobile client; returning information about the requested third-party application to the mobile client; wherein the mobile client verifies a user identity with a biometric sensor; receiving from the mobile client, an authentication authorization if the user identity is verified by the mobile client using the biometric sensor; sending a user authentication information to the third party application, if the authentication authorization is received from the mobile client; wherein the third party application may submit a login form with the authentication payload; receiving a request to authenticate the user, from the third party application; returning to the third party application, a custom user identifier, a custom mobile client device information, or a geographical location of the mobile client for the third party application; wherein the third party application correlates the custom user identifier, the custom mobile client device information, or the geographical location of the mobile client for the third party application to a previously saved user information and if the correlation is successful, provides access to the third party application to the mobile client.

2. The method of claim 1 wherein the downloadable authentication payload is at least one of a QR code, hyperlink, and a dynamic NFC tag.

3. The method of claim 2 wherein the authentication payload refers to an internet link with instructions or code that is downloaded to a computing device scanning it, through a network or internet connection.

4. The method of claim 1 further comprising, initial authentication registration, before the mobile authentication server computer receives a request from a third-party application for an authentication payload,
receiving registration of the mobile client at the mobile authentication server with an email or phone number;
sending at the mobile authentication server, a confirmation email or text message to the mobile client using the received email or phone number, wherein the mobile client saves the confirmation email or text message;
receiving at the mobile authentication server, a confirmation response from the mobile client;
sending at the mobile authentication server, a notification that the mobile client is registered.

5. The method of claim 1 wherein the authentication payload is a unique alphanumeric sequence.

6. The method of claim 1 wherein the biometric sensor is at least one of a face scanning camera, fingerprint reader, and voice recognition system.

7. The method of claim 1 wherein the internal user information is locally stored, stored in a distributed database, or stored in a back end system.

8. The method of claim 1 wherein after authentication, the mobile client is authorized to complete at least one of, sharing files, taking pictures, recording videos, recording audio clips, entering text, making calls, sending text messages, getting geographical locations of the user, or performing a payment.

9. A non-transitory computer-readable medium having computer-executable instructions thereon for a method of authentication, the method comprising:
by a mobile authentication server computer with a processor and a memory,
in response to a user attempting a security required task, receiving a request from a third-party application for an authentication payload,
wherein the third-party application having registered and received an application identifier and a secret; returning a downloadable authentication payload to the third-party application; wherein the authentication payload having been rendered or downloaded by the third-party application; wherein the authentication payload having been transferred from the third-party application to a mobile client; wherein the mobile client may download the downloadable authentication payload from the third-party application, receiving a request for third-party application information from the mobile client; returning information about the requested third-party application to the mobile client; wherein the mobile client verifies a user identity with a biometric sensor; receiving from the mobile client, an authentication authorization if the user identity is verified by the mobile client using the biometric sensor; sending a user authentication information to the third party application, if the authentication authorization is received from the mobile client; wherein the third party application may submit a login form with the authentication payload; receiving a request to authenticate the user, from the third party application; returning to the third party application, a custom user identifier, a custom mobile client device information, or a geographical location of the mobile client for the third party application; wherein the third party application correlates the a custom user identifier, a custom mobile client device information, or a geographical location of the mobile client for the third party application to a previously saved user information and if the correlation is successful, provides access to the third party application to the mobile client.

10. The non-transitory computer-readable medium of claim 9 wherein the downloadable authentication payload is a QR code.

11. The non-transitory computer-readable medium of claim 10 wherein the QR code refers to an internet link with instructions or code that is downloaded to a computing device scanning it, through a network or internet connection.

12. The non-transitory computer-readable medium of claim 9 further comprising, initial authentication registration, before the mobile authentication server computer receives a request from a third-party application for an authentication payload,
receiving registration of the mobile client at the mobile authentication server with an email or phone number;
sending at the mobile authentication server, a confirmation email or text message to the mobile client using the received email or phone number, wherein the mobile client saves the confirmation email or text message;
receiving at the mobile authentication server, a confirmation response from the mobile client;
sending at the mobile authentication server, a notification that the mobile client is registered.

13. The non-transitory computer-readable medium of claim 9 wherein the authentication payload is a unique alphanumeric sequence.

14. The non-transitory computer-readable medium of claim 9 wherein the biometric sensor is at least one of a face scanning camera, fingerprint reader, and voice recognition system.

15. The non-transitory computer-readable medium of claim 9 wherein the internal user information is locally stored, stored in distributed database, or stored in a back end system.

16. The non-transitory computer-readable medium of claim 9 wherein after authentication, the mobile client is authorized to complete at least one of, sharing files, taking pictures, recording videos, recording audio clips, entering text, making calls, sending text messages, getting geographical locations of the user, or performing a payment.

\* \* \* \* \*